(12) United States Patent
Thomas et al.

(10) Patent No.: US 10,148,654 B2
(45) Date of Patent: Dec. 4, 2018

(54) ENCRYPTION FOR A SYNCHRONOUS WIRELESS LINK

(71) Applicant: Cambium Networks Limited, Ashburton, Devon (GB)

(72) Inventors: Mark Thomas, Ashburton (GB); Richard Carter, Ashburton (GB); Gregor Dean, Ashburton (GB)

(73) Assignee: CAMBIUM NETWORKS LTD, Ashburton, Devon (GB)

( * ) Notice: Subject to any disclaimer, the term of this patent is extended or adjusted under 35 U.S.C. 154(b) by 0 days.

(21) Appl. No.: 15/660,703

(22) Filed: Jul. 26, 2017

(65) Prior Publication Data
US 2018/0034815 A1 Feb. 1, 2018

(30) Foreign Application Priority Data
Jul. 27, 2016 (GB) .................................. 1612997.5

(51) Int. Cl.
*G06F 21/00* (2013.01)
*H04L 29/06* (2006.01)
(Continued)

(52) U.S. Cl.
CPC ...... *H04L 63/0876* (2013.01); *H04L 63/0823* (2013.01); *H04L 63/162* (2013.01);
(Continued)

(58) Field of Classification Search
CPC ............... H04L 63/0876; H04L 63/162; H04L 63/0823; H04L 63/0428; H04L 63/061; H04W 12/02; H04W 12/04
See application file for complete search history.

(56) References Cited

U.S. PATENT DOCUMENTS

| 5,319,712 A * | 6/1994 | Finkelstein ............. H04L 29/06 380/28 |
| 2002/0110243 A1 | 8/2002 | Jiang et al. |

(Continued)

FOREIGN PATENT DOCUMENTS

| EP | 1 182 825 A2 | 2/2002 |
| GB | 2530851 A | 4/2016 |

(Continued)

OTHER PUBLICATIONS

Search Report corresponding to GB1612997.5 dated Mar. 1, 2017, 5 pages.

(Continued)

*Primary Examiner* — Lisa C Lewis
(74) *Attorney, Agent, or Firm* — Brinks, Gilson & Lione

(57) ABSTRACT

Encryption is provided for a wireless network comprising a first wireless station and at least a second wireless station. First messages are exchanged between the first wireless station and the second wireless station over a first synchronous wireless link to establish a shared secret and a first session key, the first messages not being encrypted. The MAC layer of the first synchronous wireless link is then encrypted using encryption on the basis of the first session key, then further messages are exchanged between the first wireless station and the second wireless station over the first synchronous wireless link to establish a second session key, the further messages being encrypted by the encryption of the MAC layer of the first synchronous wireless link. The MAC layer of the first synchronous wireless link is then encrypted using encryption on the basis of the second session key.

20 Claims, 7 Drawing Sheets

(51) Int. Cl.
*H04W 12/02* (2009.01)
*H04W 12/04* (2009.01)

(52) U.S. Cl.
CPC ......... *H04W 12/02* (2013.01); *H04L 63/0428* (2013.01); *H04L 63/061* (2013.01); *H04W 12/04* (2013.01)

(56) References Cited

U.S. PATENT DOCUMENTS

| | | | | |
|---|---|---|---|---|
| 2003/0014646 | A1* | 1/2003 | Buddhikot | H04L 63/062 713/184 |
| 2005/0047602 | A1 | 3/2005 | Lee et al. | |
| 2005/0188194 | A1* | 8/2005 | Fascenda | H04L 63/0272 713/155 |
| 2006/0062319 | A1* | 3/2006 | Kloos | H04K 1/006 375/264 |
| 2006/0182124 | A1* | 8/2006 | Cole | H04L 63/0428 370/395.54 |
| 2012/0311322 | A1* | 12/2012 | Koyun | G06Q 20/3227 713/156 |
| 2016/0359551 | A1* | 12/2016 | Roy | H04B 7/18523 |

FOREIGN PATENT DOCUMENTS

| | | |
|---|---|---|
| WO | WO 2005/015819 A1 | 2/2005 |
| WO | WO 2005/034412 A2 | 4/2005 |
| WO | WO 2013/085694 A1 | 6/2013 |

OTHER PUBLICATIONS

International Search Report and the Written Opinion corresponding to International Application No. PCT/GB2017/052167 dated Oct. 4, 2017, 12 pages.

* cited by examiner

| S 2.1 | Exchange messages according to a first cryptographic protocol between a master wireless station and a slave wireless station over a synchronous wireless link to establish a shared secret and a first session key, the messages not being encrypted |

| S 2.2 | Use the first session key to encrypt the synchronous wireless link including the MAC layer |

| S 2.3 | Exchange messages according to the first cryptographic protocol between the master wireless station and the slave wireless station over the encrypted synchronous wireless link to establish a second session key |

| S 2.4 | Use the second session key to encrypt the synchronous wireless link |

Figure 2

ENCRYPTION FOR A SYNCHRONOUS WIRELESS LINK

CROSS-REFERENCE TO RELATED APPLICATIONS

This application claims the benefit of UK Application No. GB 1612997.5, filed Jul. 27, 2016, which is incorporated by reference in its entirety.

TECHNICAL FIELD

The present invention relates generally to encryption for a synchronous wireless link, and more specifically, but not exclusively, to a method of encryption and re-keying for a synchronous time division duplex point-to-point or point-to-multipoint wireless link.

BACKGROUND

It may be desired to provide encryption for data transported across a synchronous wireless link, in particular because of the inherent vulnerability of wireless links to interception. A synchronous wireless link may, for example, take the form of a microwave link, which may have a range of several kilometres between antenna towers, as a point to point link between two wireless stations. A synchronous wireless link may also take the form of a point to multi-point link, for example connecting a master wireless station to a number of slave wireless stations. The wireless stations on the link transmit and receive in a connection-oriented synchronous manner, for example according to a predetermined time division duplex and time division multiplex frame sequence, in which the timing of the transmissions from each wireless station is determined with respect to a common time reference. Typically transmissions occur within a designated timeslot, irrespective of whether there is payload data to transfer. This is in contrast to a packet oriented data network such as a TCP/IP network, in which packets may be transmitted opportunistically between a server and a client according to the demands of payload traffic, each packet typically having a header indicating its destination.

One known approach to providing encryption is to encrypt the MAC layer of a synchronous wireless link between wireless stations. The wireless stations may be controlled by the same operator, and the encryption and decryption may use a cryptographic key configured at both ends of the link by the operator. The cryptographic key may be a pre-shared secret key which is loaded by the operator into each station, for example by a site visit. However, the use of pre-shared keys may be cumbersome in a point-to-multipoint link, in particular if slave units are to be deployed in an ad-hoc fashion. Furthermore, replacing keys periodically may become onerous, involving either a site visit or a means of securely updating keys remotely.

Alternatively, encryption may be provided by sending a data stream comprising conventional encrypted datagrams over a wireless link to provide a secure data connection. It is well known to encrypt payload traffic in an asynchronous data network using a cryptographic protocol, such as the Transport Layer Security (TLS) protocol. This may provide a secure connection between two hosts in a computer network. For example secure connections may be provided between a web browser and a web server, providing encrypted datagrams which carry encrypted data. The encrypted data is encapsulated within packets having unencrypted MAC headers such as TCP/IP headers. The headers may be read by routers in the network to route the packets to the correct destination, but the data within the packets forms a secure connection. However, this approach is vulnerable to traffic analysis to determine characteristics or routing details of payload data.

SUMMARY

In accordance with a first aspect of the invention there is provided a method of encryption for a wireless network comprising a first wireless station and at least a second wireless station, the method comprising:

providing a first synchronous wireless link between the first wireless station and the second wireless station;

exchanging first messages between the first wireless station and the second wireless station over the first synchronous wireless link to establish a shared secret and a first session key, the first messages not being encrypted;

encrypting the MAC layer of the first synchronous wireless link using encryption on the basis of the first session key;

exchanging further messages between the first wireless station and the second wireless station over the first synchronous wireless link to establish a second session key, the further messages being encrypted by the encryption of the MAC layer of the first synchronous wireless link; and encrypting the MAC layer of the first synchronous wireless link using encryption on the basis of the second session key.

This allows the establishment of a session key without the need for pre-shared keys and allows update of the session key without a site visit. An advantage of encrypting the further messages by the encryption of the MAC layer of the first synchronous wireless link is that this provides for additional security of the session keys and furthermore the encryption of the MAC layer of the first synchronous wireless link provides protection against traffic analysis to determine characteristics or routing details of payload data.

In an embodiment of the invention, the shared secret is established using asymmetric encryption. The asymmetric encryption may be Rivest-Shamir-Adleman (RSA) encryption. This provides a secure but computationally intensive method of obtaining the shared secret.

In an embodiment of the invention, the exchange of the first messages comprises:

exchange of RSA certificates for authentication of each wireless station;

matching of MAC addresses to a whitelist; and negotiation of mutually supported cipher suites.

This allows mutual authentication between the wireless stations, mitigating against interception by an unauthorised wireless station.

In an embodiment of the invention, exchanging the first messages and exchanging the further messages is in accordance with Transport Layer Security (TLS) protocol.

In an embodiment of the invention, exchanging the first messages and exchanging the further messages is in accordance with one or more of the following Internet Engineering Task Force documents: RFC 3748; RFC 5216; and RFC 5246.

Exchanging messages according to the TLS protocol provides a well developed and reliable message protocol to establish and update the session key. Unlike a standard TLS application, the session keys are not applied to the TLS record layer, but are instead used to encrypt the MAC layer of the first synchronous wireless link.

In an embodiment of the invention, encrypting the MAC layer of the first synchronous wireless link is by symmetric encryption. The symmetric encryption may be Advanced Encryption Standard (AES) encryption.

This is less computationally demanding than asymmetric encryption such as RSA encryption.

In an embodiment of the invention, encrypting the MAC layer of the first synchronous wireless link comprises encrypting the entire synchronous data stream carried by the first synchronous wireless link.

This provides reduced vulnerability to traffic analysis by potential eavesdroppers.

In an embodiment of the invention, encrypting the MAC layer of the first synchronous wireless link comprises protecting the link between the first wireless station and the second wireless station and not protecting an end-to-end link between a server and client for payload data carried on the link.

This allows the management of encryption and re-keying by the operator of the wireless link independently of any encryption between the server and client.

In an embodiment of the invention, the first wireless link is a bi-directional link operating according to a time division duplex (TDD) frame structure.

In an embodiment of the invention, the first wireless station is a master wireless station and the second wireless station is a first slave wireless station, and a second synchronous wireless link is provided between the master wireless station and a second slave wireless station, the second synchronous wireless link being in a time division duplex (TDD) and time division multiplex (TDM) relationship with the first synchronous wireless link. A different session key may be established for encryption of the first and second wireless links.

This avoids compromising a session key used by a slave wireless station if another slave wireless station is lost.

In an embodiment of the invention, the key size for encryption of the first link is different from the key size for encryption of the second link.

This allows slave wireless stations that support different encryption key sizes, for example 128-bit 256-bit, to be used in a point to multipoint wireless network with the same master wireless station.

In an embodiment of the invention, transmission of payload data is disabled during the exchange of the first messages according to a first cryptographic protocol.

This prevents transmission of payload over an unencrypted link.

In an embodiment of the invention, the exchange of the further messages is dependent on expiry of a re-key interval timer.

In an embodiment of the invention, a transition from encryption using the first session key to encryption using the second session key is delayed in dependence on timing of a transition between blocks of data for encryption.

This allows a seamless transition from the use of encryption using one session key to use of encryption using another session key without the loss or interruption of payload data.

In an embodiment of the invention, a transition from decryption using the first session key to decryption using the second session key is effected in dependence on reception of a message sent from the first wireless station to the second wireless station in a header of a block of encrypted data on the first wireless link.

In accordance with a second aspect of the invention there is provided apparatus comprising a first wireless station and at least a second wireless station configured to:

provide a first synchronous wireless link between the first wireless station and the second wireless station;

exchange first messages between the first wireless station and the second wireless station over the first synchronous wireless link to establish a shared secret and a first session key, the first messages according to a first cryptographic protocol not being encrypted;

encrypt the MAC layer of the first synchronous wireless link using encryption on the basis of the first session key;

exchange further messages between the first wireless station and the second wireless station over the first synchronous wireless link to establish a second session key, the further messages being encrypted by the encryption of the MAC layer of the first synchronous wireless link; and encrypt the MAC layer of the first synchronous wireless link using encryption on the basis of the second session key.

Further features of the invention will be apparent from the following description of preferred embodiments of the invention, which are given by way of example only.

BRIEF DESCRIPTION OF THE DRAWINGS

FIG. 2 is a flow diagram showing steps of a method of encryption for a wireless link in an embodiment of the invention;

DETAILED DESCRIPTION

By way of example, embodiments of the invention will now be described in the context of point-to-point and a point-to-multipoint wireless network operating as a time division duplex system at carrier frequencies typically between 3 and 6 GHz. However, it will be understood that this is by way of example only and that other embodiments may involve other wireless systems and frequencies, and embodiments are not restricted to a specific frequency band of operation or a specific standard, and may involve operation in licensed or unlicensed bands.

Figure 1:
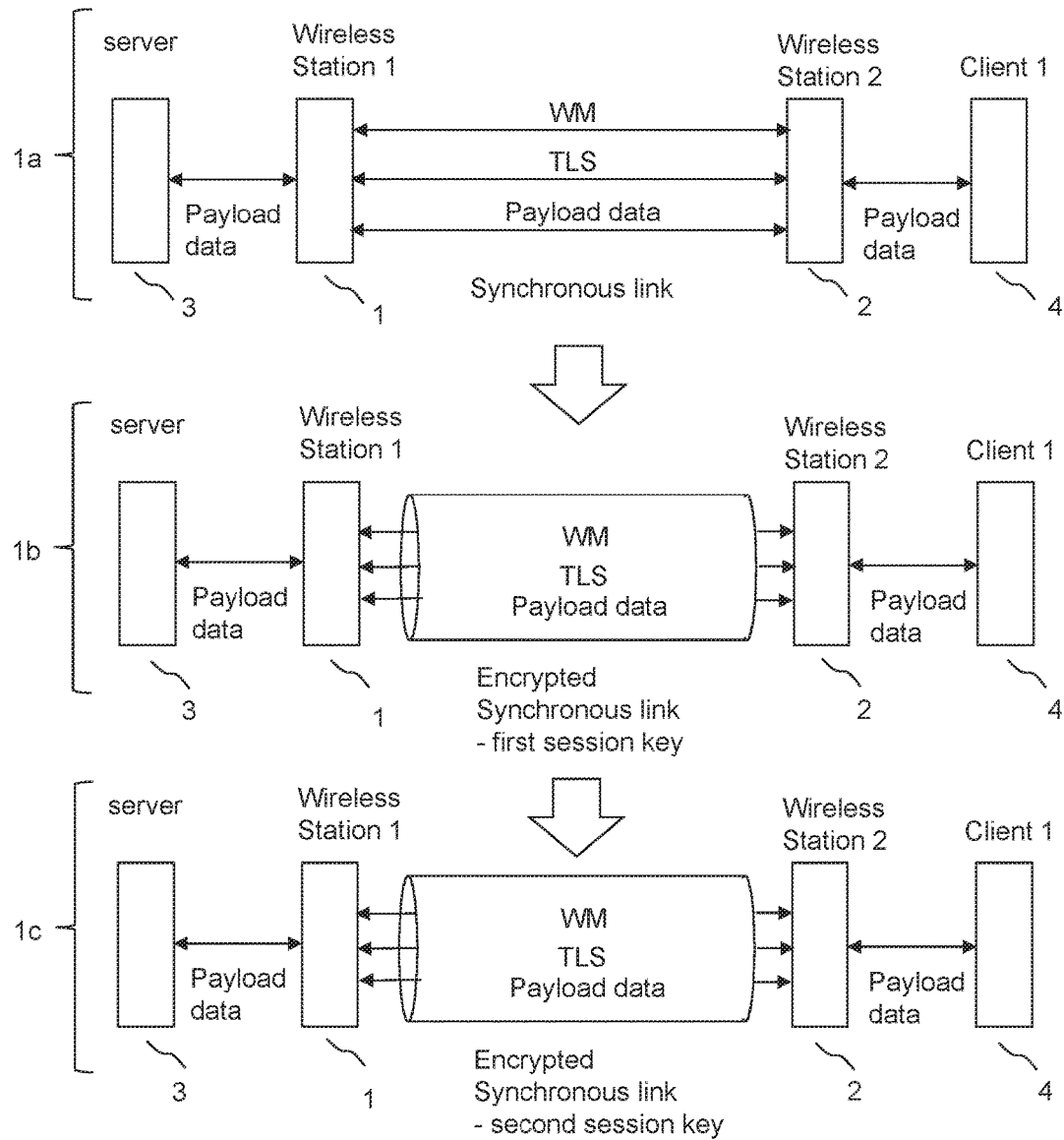
FIG. 1 is a schematic diagram showing a synchronous wireless link in an embodiment of the invention, showing: at 1a, TLS negotiation between the wireless stations over an unencrypted synchronous link to establish a first session key; at 1b, encryption of the synchronous link using a first session key and subsequent TLS negotiation between the wireless stations over the encrypted synchronous link to establish a second session key; and at 1c, encryption of the synchronous link using the second session key.

FIG. 1 shows a synchronous wireless link in an embodiment of the invention, showing, at 1a, 1b and 1c, the link at different stages of the establishment of the encryption on the wireless link. In each case, a synchronous wireless link is set up between a first wireless station 1 and a second wireless station 2. Payload data may be sent over the synchronous wireless link, the payload data being exchanged between a server 3 and a client 4 which may be connected by fixed wired links, such as optical fibre links, to the wireless stations. For example, the server may be a web server, and the client may be a web browser. The wireless stations may be respective ends of a microwave link mounted on antenna towers.

Initially, as shown at 1*a*, the synchronous wireless link is unencrypted. In an embodiment of the invention, messages are exchanged according to a first cryptographic protocol between the first wireless station and the second wireless station over the first synchronous wireless link to establish a shared secret and a first session key. These first messages are not encrypted. The shared secret may be established using asymmetric encryption, which may be Rivest-Shamir-Adleman (RSA) encryption. These messages involved in establishing the shared secret are conventional and well known, and are designed to be exchanged on an unencrypted link.

Typically the exchange of the first messages according to the first cryptographic protocol comprises exchange of RSA certificates for authentication of each wireless station, matching of MAC addresses to a whitelist and negotiation of mutually supported cipher suites. These functions are conventional and well known and allow the wireless stations to authenticate each other before establishing the shared secret.

Exchanging the first messages may be in accordance with the well-known Transport Layer Security (TLS) protocol, which is described in Internet Engineering Task Force document RFC 5246.

Then, as shown at 1*b*, once the first session key, which may be referred to as a "key", has been established, the MAC layer of the first synchronous wireless link is encrypted using encryption on the basis of the first session key, which may be reffered to as the first key. Typically, encrypting the MAC layer of the first synchronous wireless link is by symmetric encryption. The symmetric encryption may be Advanced Encryption Standard (AES) encryption, which is well known and well suited for encrypting all the data of synchronous wireless link because it is less computationally demanding than asymmetric encryption such as RSA encryption. The encryption is represented at 1*b* by the depiction of the synchronous wireless link as an opaque pipe. As can be seen, all of the data carried by the synchronous link is encrypted, including payload data, wireless management (WM) signals passed between the wireless station, and the messages according to the a first cryptographic protocol, in this example Transport Layer Security (TLS) messages. As shown at 1*b*, the TLS messages are exchanged as further messages according to the first cryptographic protocol between the first wireless station and the second wireless station over the first synchronous wireless link to establish a second session key. This process may be referred to as re-keying. The further messages for the re-keying operation may be according to the Session Resumption Protocol Extension defined in Internet Engineering Task Force document RFC5077.

However, unlike the prior art systems, these further messages, in an embodiment of the invention, are encrypted by the encryption of the MAC layer of the first synchronous wireless link. In prior art systems, the exchange of cryptographic protocol messages to establish a session key are designed to be performed over an unencrypted link. Exchanging the first messages over an unencrypted link, encrypting the link, and then exchanging the further messages over the encrypted link has the advantage of some improvement in security, and also providing a link which is not vulnerable to traffic analysis by eavesdropping. The encryption of the whole link including the MAC layer is made possible by the provision of the synchronous, connection oriented, wireless link.

Then, as shown at 1*c*, the MAC layer of the first synchronous wireless link is encrypted using encryption on the basis of the second session key. This update of the session key may be carried out periodically. The encrypting of the further messages by the encryption of the MAC layer of the first synchronous wireless link provides for additional security of the session keys. Also, as already mentioned, the encryption of the MAC layer provides protection against traffic analysis by any eavesdroppers of the wireless link.

It can be seen from FIG. 1 that it is only the link between the first wireless station and the second wireless station that is protected by the encryption of the synchronous wireless link, and not the whole end-to-end link between a server and client as would be the case in a prior art TLS system, allowing the management of encryption and re-keying by the operator of the wireless link independently of any encryption between the server and client.

FIG. 2 is a flow diagram showing steps of a method of encryption for a wireless link in an embodiment of the invention. At step S2.1, messages are exchanged according to a first cryptographic protocol between a master wireless station and a slave wireless station over a synchronous wireless link to establish a shared secret and a first session key, the messages not being encrypted. At S2.2 the first session key is used to encrypt the synchronous wireless link including the MAC layer. At S2.3, messages are exchanged according to the first cryptographic protocol between the master wireless station and the slave wireless station over the encrypted synchronous wireless link to establish a second session key. Then at step S2.4, the second session key is used to encrypt the synchronous wireless link. The first cryptographic protocol may be a well known protocol such as TLS as already mentioned.

Figure 3:
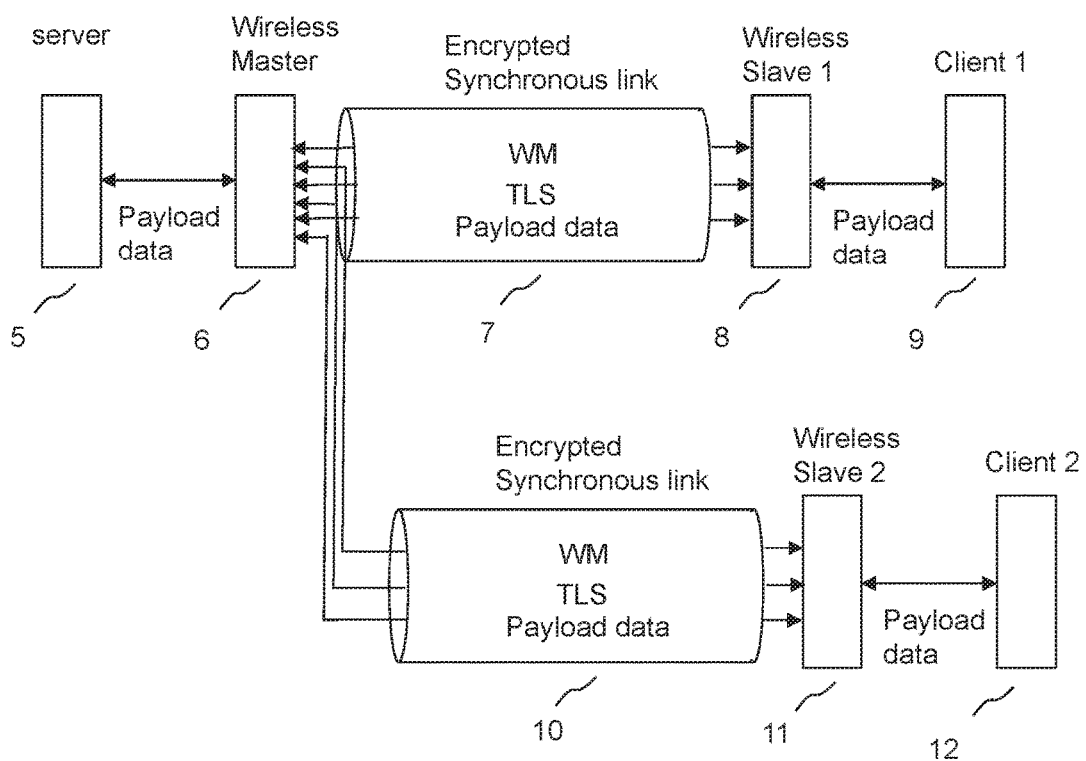
FIG. 3 is a schematic diagram showing a point to multipoint synchronous wireless link comprising a wireless master station and two wireless slave stations in an embodiment of the invention.

FIG. 3 shows a point to multipoint synchronous wireless link comprising a wireless master station and two wireless slave stations in an embodiment of the invention. A data server 5 is shown in communication with a first client 9 and a second client 12. A master wireless station 6 has a first synchronous link 7 to a first slave wireless station 8, and a second synchronous wireless link 10 is provided between the master wireless station 6 and a second slave wireless station 11. Timing for the synchronous links is typically provided by the master station. The second synchronous wireless link is in a time division duplex (TDD) and time division multiplex (TDM) relationship with the first synchronous wireless link, as part of a TDD and TDM frame structure. A different session key may be established for encryption of the first and second wireless links, by the exchange of respective separate first messages and separate respective second messages. This avoids compromising a session key used by a slave wireless station if another slave wireless station is lost. The key size for encryption of the first link may be different from the key size for encryption of the second link, allowing slave wireless stations that support different encryption key sizes, for example 128-bit 256-bit, to be used in a point to multipoint wireless network with the same master wireless station. This may be achieved by separate negotiation of encryption key size for each link, by the well-known protocols.

Figure 4:
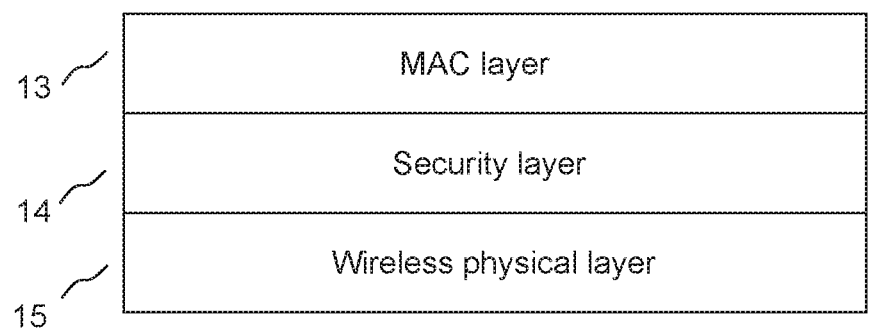
FIG. 4 shows a security layer interposed between the wireless physical layer and the MAC layer in an embodiment of the invention, to encrypt the MAC layer.
Figure 6:
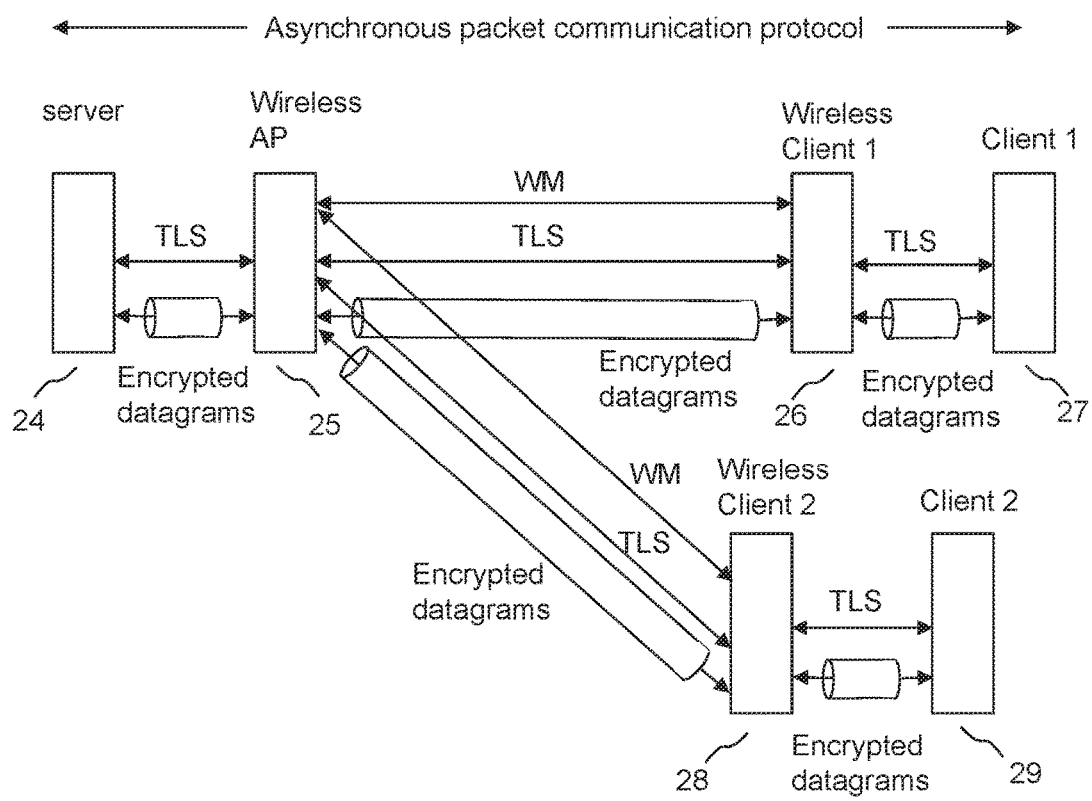
FIG. 6 is a schematic diagram showing use of TLS negotiation to encrypt payload data within encrypted datagrams encapsulated within conventional MAC headers on an asynchronous link end-to-end between a server and clients.

FIG. 4 shows that a security layer interposed between the wireless physical layer and the MAC layer in an embodiment of the invention, to encrypt the MAC layer. This is by contrast with a conventional TLS approach as shown in FIG. 6, in which payload data is encrypted within encrypted datagrams encapsulated within MAC headers on an asynchronous link end-to-end between a server and clients in a prior art system.

Figure 5:
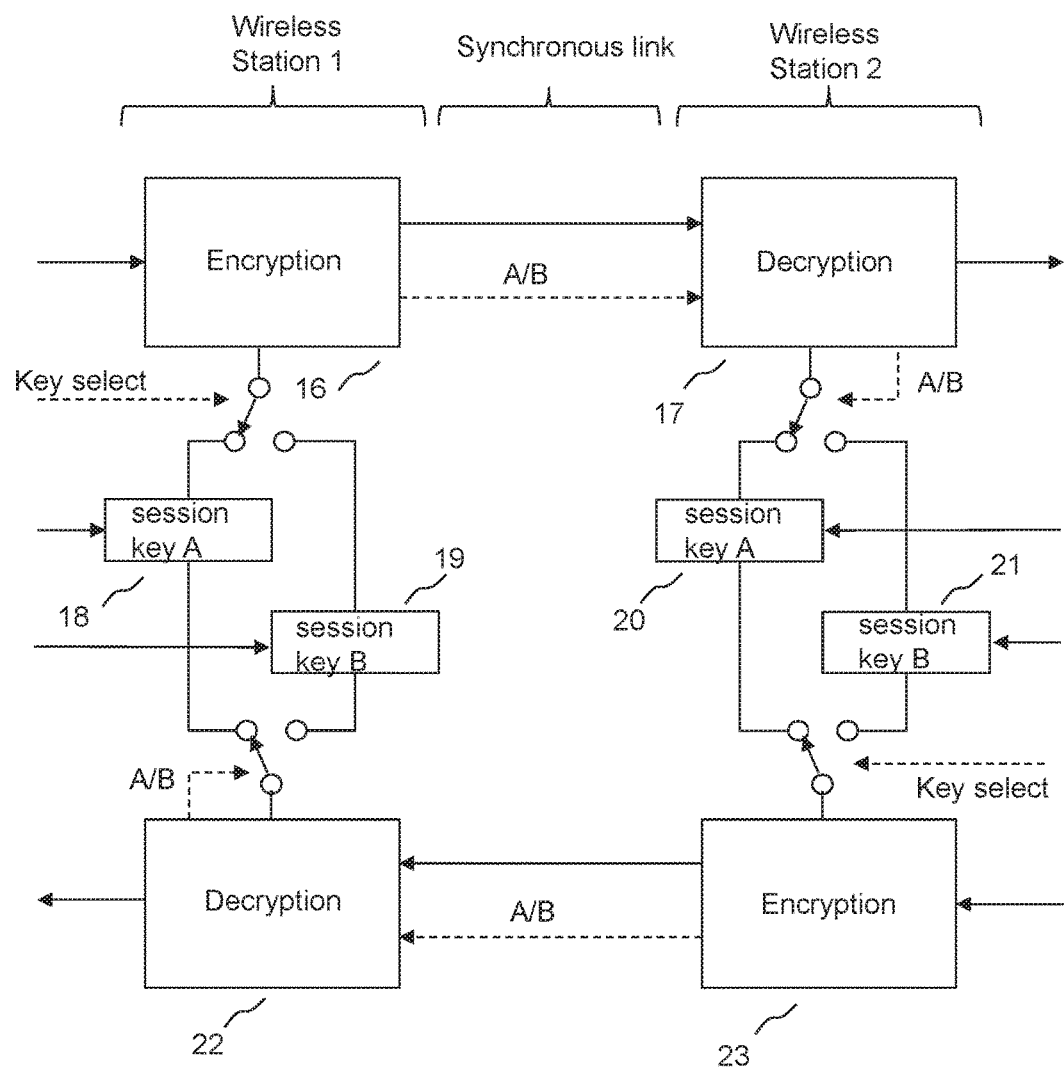
FIG. 5 is a schematic diagram illustrating an architecture to effect the seamless transition from a use of a first session key to use of a second session key in an embodiment of the invention.

FIG. 5 is a schematic diagram illustrating an architecture to effect the seamless transition from a use of a first session key to use of a second session key in an embodiment of the invention. A synchronous data stream is encrypted in an encryption function 16 at the first wireless station and is decrypted in a decryption function 17 at the second wireless station. Session keys A and B are held in registers 18, 19, 20 and 21 at both wireless stations, having been provided by the cryptographic protocol negotiation process, typically according to TLS. Session key A may be the current session key and session key B may be the next updated session key, that is to say the key to be used for re-keying. When it is determined to change the session key, which may be following determination of a new session key following the exchange of the further messages after expiry of a re-key interval timer, a key select message selects the appropriate session key to apply to the encryption function 16. The selection may, for example, move from key A to key B. The transition from decryption using one session key to decryption using the second session key is effected in dependence on reception of a message sent from the first wireless station to the second wireless station in a header of a block of encrypted data on the first wireless link. For example, the MAC layer of the first wireless link may be split into 128-bit blocks and encrypted using AES. The signalling of the A/B key may be in a header of the encrypted blocks, that is to say the header of a crypto block. The message is shown as A/B in FIG. 5. A similar process is carried out for a data stream encrypted in an encryption function 23 at the first wireless station and is decrypted in a decryption function 22 at the second wireless station.

A transition from encryption using the first session key to encryption using the second session key may be delayed in dependence on timing of a transition between blocks of data for encryption to allow a seamless transition from the use of encryption using one session key to use of encryption using another session key without the loss or interruption of payload data.

Transmission of payload data is disabled during the exchange of the first messages according to a first cryptographic protocol.

This prevents transmission of payload over an unencrypted link.

FIG. 6 is a schematic diagram showing conventional use of TLS negotiation to encrypt payload data within encrypted datagrams encapsulated within MAC headers on an asynchronous link end-to-end between a server 24 and clients 27, 29. A wireless access point 25, for example a Wi-Fi access point may communicate with wireless clients 26, 28 as part of the end-to end link. However, data is encrypted in datagrams and the wireless MAC layer and TLS messages are not encrypted, unlike in embodiments of the system according to the present invention in which first TLS messages are not encrypted and the further TLS messages are encrypted by being sent across an encrypted wireless link.

Exchanging messages according to the TLS protocol provides a well known, well developed and reliable message protocol to establish and update the session key. However, in embodiments of the invention, unlike in a standard TLS application, the session keys are used to encrypt the MAC layer of the first synchronous wireless link, are not applied to the TLS record layer.

Figure 7:
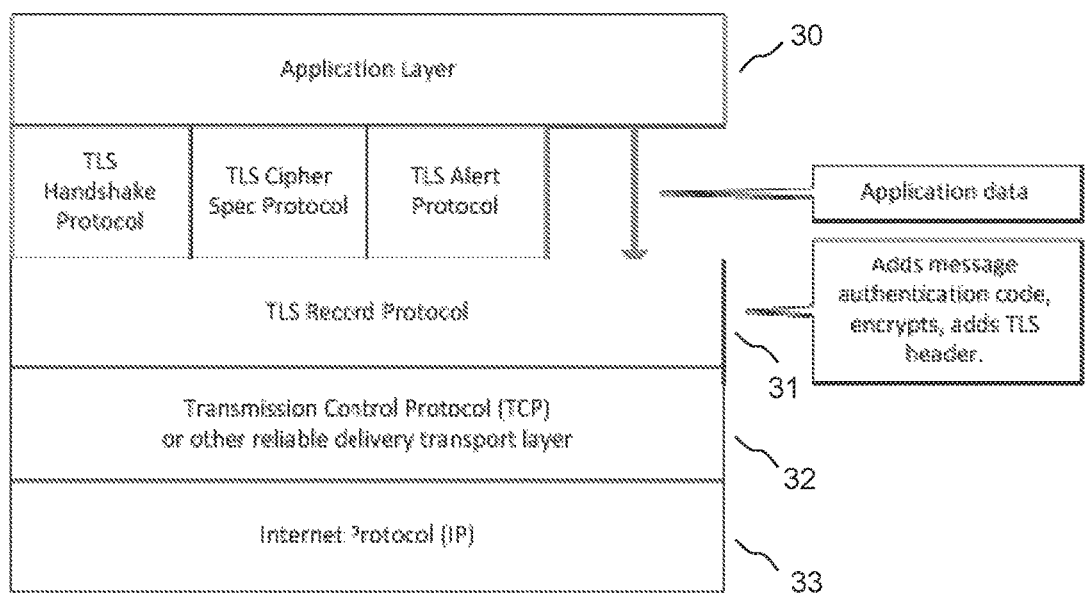
FIG. 7 shows a representation of layers of a conventional TLS protocol illustrating encryption of the TLS record layer.

FIG. 7 shows a representation of layers of a conventional TLS protocol illustrating encryption of the TLS record layer. Transport Layer Security (TLS) is a well-established standard method providing a secure connection between two hosts in a computer network. The secure connection is used by an Application Layer protocol. A well-known example is the HTTPS protocol used for secure connections between a web browser and a web server. HTTPS is the HTTP application layer protocol over a secure TLS connection. The TLS protocol consists of a common Record Protocol and three control protocols. Application data is carried directly by the Record Protocol, as shown in FIG. 7.

Conventionally, a typical connection is established in the first instance without encryption at the Record Layer. Negotiation of a cipher suite and authentication of the parties are then carried out using asymmetric cryptographic methods (for example RSA) that are secure without further protection from the lower layer. The handshake may result in agreement or transfer of a master secret between the ends of the link. The ends of the link then enable encryption at the Record Protocol layer using symmetric encryption (for example AES) with a session key derived from the master secret. Application data (and further control messages) are encrypted using symmetric encryption. The transfer or agreement of a master secret using asymmetric encryption removes the need to distribute a pre-shared encryption key, thereby allowing secure communication to be between parties without previous arrangement, and the encryption of the larger volumes of application data can be achieved using symmetric algorithms that are computationally much more efficient than the asymmetric algorithms used in the handshake phase.

The TLS connection is conventionally between an application on a host (for example a web browser) and a related application (for example a web server) on a different host. The data exchanged is necessarily encapsulated in datagrams that can be used to route traffic between the applications, for example using IP address and TCP port number. The exposure of the routing information makes the connection vulnerable to traffic analysis even though the encapsulated payload might be securely encrypted by the Record Protocol.

Some existing radio systems can be modelled as a pair of two-port Layer 2 bridges in which each bridge has a wired Ethernet port and a wireless port. The wired ports operate using packet mode. The wireless ports operate in a synchronous connection-oriented mode. The units may optionally support encryption of all data transmitted over the wireless connection. This can be modelled as a security layer or sub-layer between the MAC layer and the wireless physical layer, as shown in FIG. 4. This approach may apply encryption to all payload data without the knowledge or involvement of the higher-layer applications, and encryption may be applied to the entire synchronous data stream, meaning that traffic analysis is unable to determine any characteristics or routing details of the data transferred, or even if the connection is idle or busy. Furthermore, MAC management messages or other services, for example TDM, that are part of the wireless protocol are automatically protected. Such existing radio systems may make use of a pre-shared key, meaning that all transmissions are encrypted and decrypted using a cryptographic key configured at both ends of the link by the operator. This approach has the additional advantage that the ends of the link are intrinsically mutually authenticated; the link will not establish unless both ends have the same key, and possession of an identical secret key authenticates the remote unit to the local unit. However, the existing method does not allow for negotiation of a cryptographic method in a system where participating devices might support a variety of methods or key sizes. For example, one end of the link might support AES with 128-bit or 256-bit key size, whilst the other might support only AES with 128-bit key size, in an application where the operator is prepared to accept 128-bit encryption.

The use of a pre-shared key is straightforward in point to point links deployed as part of a planned network, but may be cumbersome in an ad hoc network. In a point to multipoint network, pre-shared keys are particularly cumbersome if each link uses a different key, because the master device must be configured with one key for each slave. Alternatively a common key could be used, with the disadvantage that loss of any slave unit potentially compromises the key used by the other slaves. Furthermore, some operators have a policy of replacing cryptographic keys periodically (typically daily, weekly or monthly). Either the operator must visit each unit to refresh the keys, or else the system must support a means to update the keys remotely and securely. This latter option is sometimes called "over the air rekeying (OTAR)".

By contrast to prior art systems, embodiments of the invention may allow, by the exchange of the first messages, secure mutual authentication of devices, support for devices with varying security capabilities, key transfer or key agreement to remove the need for pre-shared keys, and a different key in each link. By the exchange of the further messages, period key refresh is enabled without site visits.

In embodiments of the invention, the TLS Handshake, Cipher Suite and Alert protocols are used to negotiate cipher suites, to provide mutual authentication by exchange of RSA security certificates, to establish a shared master secret at each end of a link, to derive identical session keys at each end of the link, and to derive further session keys as a result of a period refresh operation. However, unlike the standard TLS application, the identical session keys are not applied to the TLS Record Layer, but to the lower-layer encryption as shown in FIG. 4. The lower-layer cryptographic function has been adapted to allow seamless transition from unencrypted to encrypted operation, and to allow replacement of the keys. FIG. 5 illustrates an architecture to effect the seamless transition from a use of a first session key to use of a second session key.

So, it may be seen that embodiments of the invention may establish each link without encryption and with bridging of customer data initially disabled. Authentication and authorisation of the wireless stations may use a TLS conversation as part of a registration phase of link establishment including: authentication based on the exchange of RSA certificates; authorization by matching the authenticated MAC address to a "whitelist"; negotiation of mutually supported cipher suites; establishing a shared master secret using RSA key exchange; and deriving session keys at each end using the TLS key derivation function.

Seamless update of an encryption engine may include: deriving session keys and initialization vectors; switching between plaintext and encryption modes seamlessly; and unblocking bridging of customer data after encryption is in place. The encryption engine may be FPGA based.

Further session keys and initialization vectors may be derived periodically, and encryption keys may be updated seamlessly.

It will be understood that the method of embodiments of the invention may be implemented by a processor at each wireless station, which may comprise program code held in a memory configured to cause the processor to perform the method. The processor may comprise one or more digital signal processors, and/or programmable logic arrays.

The first and further messages in embodiments of the invention may be sent in accordance with well-known cryptographic protocols, for example as described in Internet Engineering Task Force documents including RFC 3748; RFC 5216; RFC 5246 and RFC 5077.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of encryption for a wireless network comprising a first wireless station and at least a second wireless station, the method comprising:
   providing a first synchronous wireless link between the first wireless station and the second wireless station;
   exchanging first messages between the first wireless station and the second wireless station over the first synchronous wireless link to establish a shared secret and a first session key,
   the first messages not being encrypted;
   encrypting a MAC layer of the first synchronous wireless link using encryption on the basis of the first session key;
   exchanging further messages between the first wireless station and the second wireless station over the first synchronous wireless link to establish a second session key, the further messages being encrypted by the encryption of the MAC layer of the first synchronous wireless link; and
   encrypting the MAC layer of the first synchronous wireless link using encryption on the basis of the second session key.

2. The method of claim 1, comprising establishing the shared secret using asymmetric encryption.

3. The method of claim 2, wherein the asymmetric encryption is Rivest-Shamir-Adleman (RSA) encryption.

4. The method of claim 1, wherein exchanging the first messages comprises:
   exchange of RSA certificates for authentication of each wireless station;
   matching of MAC addresses to a whitelist; and
   negotiation of mutually supported cipher suites.

5. The method of claim 1, wherein exchanging the first messages and exchanging the further messages is in accordance with Transport Layer Security (TLS) protocol.

6. The method of claim 5, wherein exchanging the first messages and exchanging the further messages is in accordance with one or more of the following Internet Engineering Task Force documents: RFC 3748; RFC 5216; and RFC 5246.

7. The method of claim 1, wherein said encrypting the MAC layer of the first synchronous wireless link is by symmetric encryption.

8. The method of claim 7, wherein the symmetric encryption ls Advanced Encryption Standard (AES) encryption.

9. The method of claim 1, wherein encrypting the MAC layer of the first synchronous wireless link comprises encrypting an entire synchronous data stream carried by the first synchronous wireless link.

10. The method of claim 1, wherein encrypting the MAC layer of the first synchronous wireless link comprises protecting the link between the first wireless station and the second wireless station and not protecting an end-to-end link between a server and client for payload data carried on the link.

11. The method of claim 1, wherein the first wireless link is a bi-directional link operating according to a time division duplex (TDD) frame structure.

12. The method of claim 1, wherein the first wireless station is a master wireless station and the second wireless station is a first slave wireless station, the method comprising:
providing a second synchronous wireless link between the master wireless station and a second slave wireless station, the second synchronous wireless link being in a time division duplex (TDD) and time division multiplex (TDM) relationship with the first synchronous wireless link; and
establishing a different session key for encryption of the first and second wireless links.

13. The method of claim 12, wherein a key size for encryption of the first link is different from a key size for encryption of the second link.

14. The method of claim 1, comprising:
disabling transmission of payload data during the exchange of the first messages according to a first cryptographic protocol.

15. The method of claim 1, wherein said exchange of said further messages is dependent on expiry of a re-key interval timer.

16. The method of claim 1, comprising delaying a transition from encryption using the first session key to encryption using the second session key in dependence on timing of a transition between blocks of data for encryption.

17. The method of claim 1, comprising effecting a transition from decryption using the first session key to decryption using the second session key in dependence on reception of a message sent from the first wireless station to the second wireless station in a header of a block of encrypted data on the first wireless link.

18. A system comprising a first wireless station and at least a second wireless station, wherein the first and second wireless stations are configured to:
provide a first synchronous wireless link between the first wireless station and the second wireless station;
exchange first messages between the first wireless station and the second wireless station over the first synchronous wireless link to establish a shared secret and a first session key, the first messages not being encrypted;
encrypt a MAC layer of the first synchronous wireless link using encryption on the basis of the first session key;
exchange further messages between the first wireless station and the second wireless station over the first synchronous wireless link to establish a second session key, the further messages being encrypted by the encryption of the MAC layer of the first synchronous wireless link; and
encrypt the MAC layer of the first synchronous wireless link using encryption on the basis of the second session key.

19. The system of claim 18, wherein the first and second wireless stations are further configured to establish the shared secret using Rivest-Shamir-Adleman (RSA) encryption.

20. The system of claim 18, wherein the first and second wireless stations are further configured to exchange the first messages by:
exchanging Rivest-Shamir-Adleman (RSA) certificates for authentication of each wireless station;
matching MAC addresses to a whitelist; and
negotiating mutually supported cipher suites.

* * * * *